United States Patent

[11] 3,567,910

[72] Inventor Richard E. Sims
Des Plaines, Ill.
[21] Appl. No. 702,988
[22] Filed Feb. 5, 1968
[45] Patented Mar. 2, 1971
[73] Assignee Teletype Corporation
Skokie, Ill.

[54] TAPE READER
8 Claims, 3 Drawing Figs.

[52] U.S. Cl. .......... 235/61.11
[51] Int. Cl. .......... G06k 5/02
[50] Field of Search .......... 235/61.114, 61.113; 73/156; 234/33, 34, 41; 200/46; 209/110

[56] References Cited

UNITED STATES PATENTS

| | | | |
|---|---|---|---|
| 2,609,433 | 9/1952 | Goff | 177/311 |
| 2,727,091 | 11/1955 | Zenner | 178/17 |
| 3,430,529 | 3/1969 | McMonagle | 83/522 |
| 3,452,926 | 7/1969 | Bradley | 234/34 |

OTHER REFERENCES

Coffman et al., IBM Technical Disclosure Bulletin, " Reluctance Sensing Device," Vol. 10, No. 2, July 1967. p. 106.

Stanton et al., IBM Technical Disclosure Bulletin, "Punch Checking," Vol. 3, No. 3, August 1960, p. 35, p. 35.

*Primary Examiner*—Maynard R. Wilbur
*Assistant Examiner*—William W. Cochran
*Attorneys*—T. L. Landis and R. P. Miller

ABSTRACT: A tape reader or verifier including a reading member or punch pin for penetrating a hole in a document, a member mounted for engagement by the reading member or punch pin upon penetration, a permanent magnet for magnetically coupling the reading member or punch pin and the member mounted for engagement by the reading member or punch pin thereby forming a normally open magnetic circuit that is closed upon penetration of the document and a coil of conductive wire positioned around the reading member or punch pin for producing an electric pulse upon an increase in the amount of flux flowing the magnetic circuit caused by the closure thereof thereby producing a signal indicative of penetration of the document.

PATENTED MAR 2 1971 3,567,910

INVENTOR
RICHARD E. SIMS

BY Michael A. O'Neil
ATTORNEY

TAPE READER

BACKGROUND OF THE INVENTION

Data processing devices that record information by perforating holes in cards, paper tapes, etc. are frequently provided with verifiers for assuring that proper characters have been perforated. The verifiers used with such devices are actually document readers positioned as close as possible to a document perforator and used to read the characters actually perforated by the perforator and to transmit the characters actually perforated to a comparator circuit for comparison with the characters sought to be perforated. The use of verifiers has heretofore sharply increased the cost of document perforators because it has required that a document reading device be a part of each document perforating device. In spite of their cost, however, the verifiers provided heretofore have not been wholly satisfactory because it has been difficult if not impossible to position them close enough to a document perforator to be truly effective.

SUMMARY OF THE INVENTION

In the preferred embodiment a combination perforator verifier that verifies at the perforating station and that can be constructed by adding a small number of easily manufactured parts to a conventional perforator is comprised of a punch pin, a die plate for cooperation with the punch pin to form holes in a document, a magnet for connecting the punch pin and the die block into a normally open magnetic circuit that is closed by the entry of the punch pin into the die block and a conductive coil for detecting an increase in the flux flowing the magnetic circuit cased by the closure thereof and for thereupon producing an electric pulse indicative of the entry of the punch pin into the die block. A convention tape reader can be constructed in accordance with the invention by substituting a document engaging reading member for the punch pin of the combination perforator-verifier.

DESCRIPTION OF THE DRAWING

A more complete understanding of the invention may be had by referring to the following detailed description when taken in conjunction with the drawing wherein.

DETAILED DESCRIPTION

Figure 1:
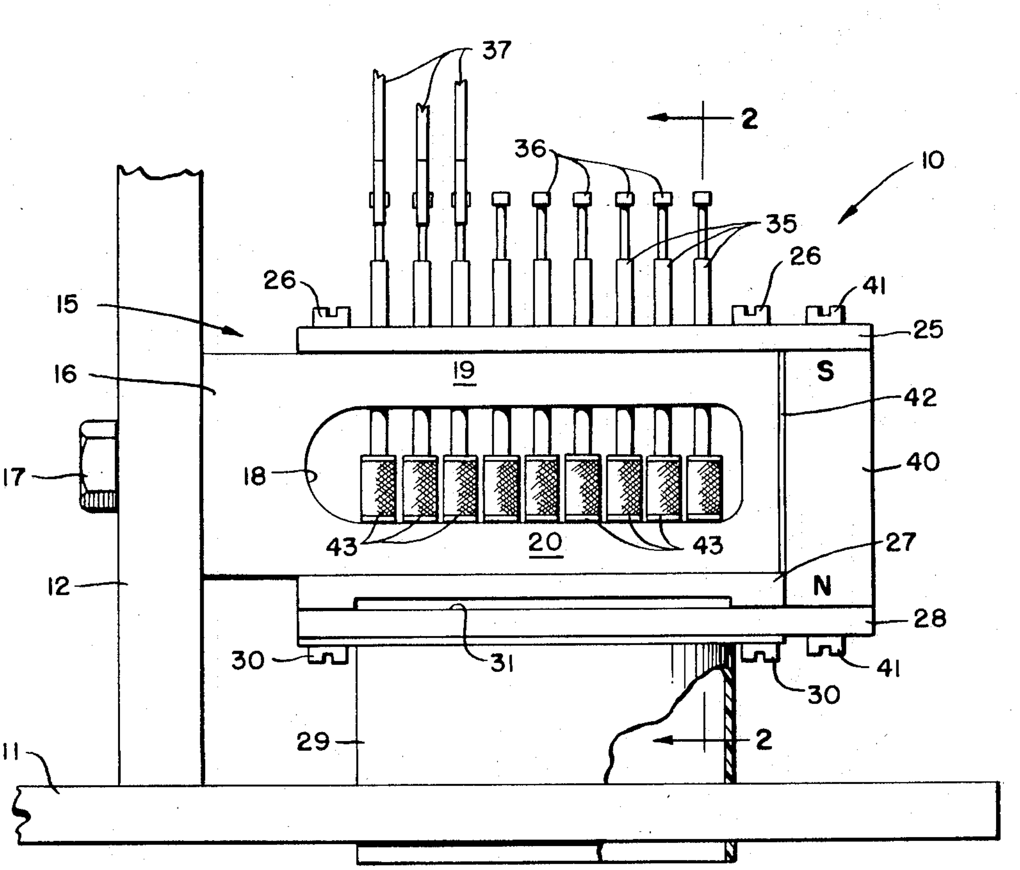
FIG. 1 is a front view of a combination perforator verifier employing the present invention in which certain parts have been broken away more clearly to illustrate certain features of the invention.

Referring now to the drawing, wherein like reference numerals designate like parts throughout the several views, and referring particularly to FIG. 1 thereof, there is shown a combination perforator-verifier 10 including a base 11 having a vertically extending member 12 mounted on it. A punch block 15 is mounted on the vertically extending member 12 and includes a frame 16 that is formed from a magnetic material and that is secured to the vertically extending member 12 by means of a bolt 17. The frame 16 has a cut away portion 18 formed in it which divides the frame 16 into an upper guide portion 19 and a lower guide portion 20.

An upper guide plate 25 formed from a magnetic material is mounted on the upper guide portion 19 of the frame 16 and is secured thereto by a pair of screws 26. A lower guide plate 27 formed from a nonmagnetic material, a die plate 28 formed from a magnetic material and a discharge chute 29 are mounted on the lower guide portion 20 of the frame 16 and are secured thereto by a pair of screws 30. The lower guide plate 27 and the die plate 28 are suitably shaped to provide a tape guide slot 31 between them.

A plurality of punch pins 35 formed from a magnetic material are mounted in the frame 16 of the punch block 15 for reciprocatory movement into and out of the die plate 28 thereby forming perforations in a length of tape (not shown) positioned in the tape guide slot 31. The punch pins 35 are each provided with a head 36 by means of which the punch pins 35 are each attached to a punch pin drive link 37, only three of which are shown. All of the parts of the combination perforator-verifier 10 numbered 11 through 37 inclusive are substantially identical to similar parts shown and described in U.S. Pat. 3,056,546 granted to Zenner Oct. 2, 1962. The punch pin drive mechanism shown in the Zenner patent may be used to reciprocate the punch pins 35 of the combination perforator-verifier 10 into and out of the die plate 28. It should be understood, however, that the combination perforator-verifier 10 may be used with any of the various punch pin drive mechanisms currently employed in both the telegraph industry and the data processing industry.

The upper guide plate 25 and the die plate 28 of the combination perforator-verifier 10 are slightly different from the equivalent parts shown in the above-identified Zenner patent in that they extend rightwardly (FIG. 1) from the frame 16 of the punch block 15. A permanent magnet 40 is mounted between the upper guide plate 25 and the die plate 28 and is secured thereto by means of a pair of screws 41. The magnet 40 is magnetically insulated from the frame 16 by a body of nonmagnetic material 42.

The remaining components of the punch block 15 also differ from those shown in the above-identified Zenner patent in that they include parts that are constructed from suitable materials to magnetically insulate the die plate 28 from the remaining components of the device. In the embodiment shown this is accomplished by forming the lower guide plate 27 from a nonmagnetic material such as brass or the like. However, this may also be accomplished by forming the frame 16 from a nonmagnetic material or by positioning nonmagnetic material between the magnet 40 and the lower guide plate 27 and between the lower guide plate 27 and the die plate 28 to provide the necessary magnetic insulation.

Figure 2:
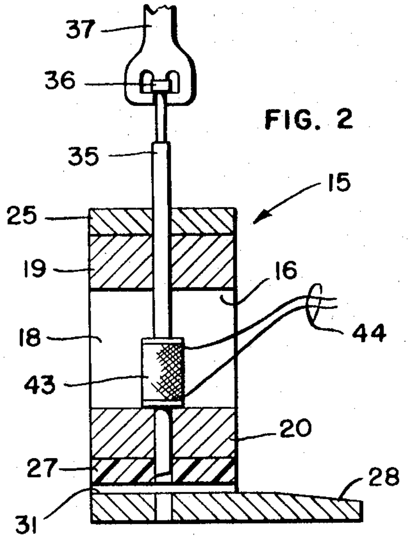
FIG. 2 is a sectional view taken along the line 2–2 in FIG. 1 in the direction of the arrows.

As is best shown in FIG. 2, the upper guide plate 25 the upper guide portion 19, a lower guide portion 20 and the lower guide plate 27 have aligned holes formed through them by means of which the punch pins 35 are guided for reciprocatory movement into and out of a similarly aligned hole in the die plate 28. Since in the preferred embodiment the die plate 28, the upper guide plate 25, the frame 16 and the punch pins 35 are formed from a magnetic material, the magnet 40 forms the combination perforator-verifier 10 into a plurality of normally open magnetic circuits each including the die plate 28, the magnet 40, the upper guide plate 25, the frame 16 and one of the pins 35. Whenever one or more of the pins 35 is reciprocated into the die plate 28, the normally opened magnetic circuit of which it forms a part is closed thereby sharply increasing the amount of flux flowing through it.

A coil of conductive material 43 having output leads 44 is positioned around each of the punch pins 35 in the cutaway portion 18 of the frame 16. The coils 43 serve to detect an increase in the flux flowing through the normally opened magnetic circuits caused by the entry of their associated punch pin 35 into the die plate 28. The coils 43 operate by producing a pulse of electric current in response to an increase in the amount of flux flowing through their associated magnetic circuit which is in turn caused by the entry of their associated punch pin into the die block 28. This pulse of current is directed through the output leads 44 of the coil to remote circuitry wherein it is compared with the signal used to cause the selective reciprocation of the punch pins 35. Thus, a simultaneous perforation and verification of a tape positioned in the slot 31 is achieved.

Figure 3:
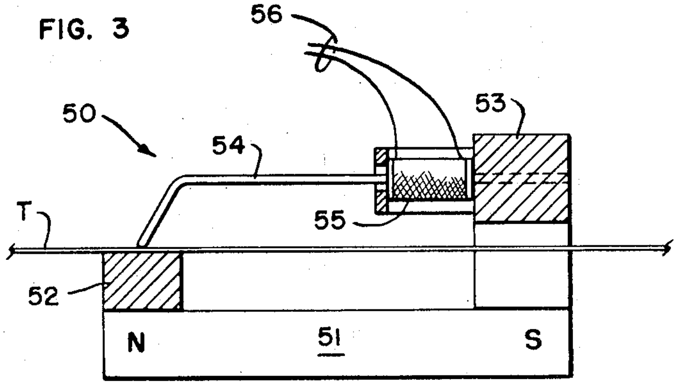
FIG. 3 is a front view of a tape reader employing the present invention in which certain parts have been broken away more clearly to illustrate certain features of the invention.

Referring now to FIG. 3 there is shown a tape reader 5C comprising a permanent magnet 51 having a block of magnetic material 52 mounted on it and also having a frame of magnetic material 53 mounted on it. A tape engaging member 54 formed from magnetic material extends from the frame 53 to a position where at it overlies block 52 and then downwardly into engagement with the block 52. The member 54 is prestress so that is is always urged into engagement with the block 52 by spring action. A coil of conductive material 55 having a pair of output leads 56 is positioned around the tape engaging brush 54.

In use, a length of tape T is drawn between the member 54 and the block 52 of the reader 50. Whenever the member 54 comes into alignment with a hole or perforation in the tape T, the prestressed spring tension of the member 54 drives it through a hole in the tape into engagement with the block 52. Engagement of the member 54 with the block 52 closes a normally opened magnetic circuit including the block 52, the magnet 51, the frame 53 and the member 54. The closure of the normally open magnetic circuit sharply increases the flux flowing in the circuit thereby generating a pulse of current in the coil 55. The current pulse is directed by means of a pair of leads 56 to a remote location and serves as in indication of the sensing of a hole in the tape T.

Although only two specific embodiments of the invention have been described herein, it should be understood that numerous other embodiments and numerous variation of the embodiments described may be employed without departing from the spirit of the invention.

I claim:

1. In a document sensing device of the type including a document engaging member for engaging a document and entering holes therein and a member mounted for engagement by the document engaging member upon entry of the document engaging member into a hole in a document, the combination with the document engagement member of:

means for magnetically coupling the document engaging member to the member engaged thereby upon entry of the document engaging member into a hole in a document thereby forming a magnetic circuit that is closed upon the entry of the document engaging member into a hole in a document; and a coil of conductive wire positioned around the document engaging member for detecting an increase in the amount of flux flowing in the magnetic circuit caused by a closure thereof thereby recognizing a hole in the document.

2. The document sensing device according to claim 1 further including a frame for supporting the document engaging member and the member engaged thereby and wherein the magnetic coupling means includes a magnet forming a part of the frame for magnetizing the frame and thereby magnetically coupling the members.

3. In a perforator of the type including a die plate having a hole formed in it, a punch pin and means for moving the punch pin into and out of the hole in the die plate, the combination with the perforator of:

a member guiding reciprocation of and arranged in engagement with the punch pin as it moves into and out of the hole in the die plate;

a magnet having opposed poles connected to said member and said die plate for magnetically coupling the punch pin and the die plate thereby forming a normally open magnetic circuit that is closed by the entry of the punch pin into the hole in the die plate; and means for detecting an increase in the amount of flux flowing in the magnetic circuit caused by the closure thereof thereby verifying the entry of the punch pin into the hole in the die plate.

4. A device for detecting holes in webs including:

a web penetrating member;

a second member positioned for engagement by the web penetrating member upon penetration of a web;

means for magnetically coupling the members; and a coil of conductive material disposed about one of said members for detecting the increase in the amount of flux flowing through the members caused by the engagement of the members upon penetration of a web by the web penetrating member and for producing a signal in response to an increase of flux flowing through the members and indicative of the penetration of the web.

5. The detecting device according to claim 4 further including means for causing the web penetrating member to penetrate a web at least in selected areas thereof.

6. A combination perforator-verifier device comprising:

a die plate having a hole formed through it;

a guide plate having a hole formed through it;

a punch pin mounted in the hole in the guide plate and reciprocable into and out of the hole in the die plate;

means for magnetically coupling the die plate to the guide plate thereby forming a normally open magnetic circuit including the die plate, the magnetic coupling means, the guide plate and the punch pin:

means for reciprocating the punch pin in the hole in the guide plate and into and out of the hole in the die plate thereby alternately opening and closing the magnetic circuit; and a coil of conductive wire positioned around the punch pin for generating a current pulse in response to an increase in the amount of flux flowing in the magnetic circuit caused by a closure thereof thereby generating a signal indicative of the entry of the punch pin into the die plate.

7. The perforator-verifier according to Claim 6 wherein the magnetic coupling means comprises a permanent magnet connected to the guide plate and the die plate.

8. The perforator-verifier according to claim 6 wherein the coil is positioned between the guide plate and :he die plate and has approximately the same inside diameter as the outside diameter of the punch pin and wherein the holes in the guide plate and the die plate have approximately the same inside diameter as the outside diameter of the punch pin.